United States Patent [19]
Bechtold et al.

[11] Patent Number: 6,007,944
[45] Date of Patent: Dec. 28, 1999

[54] RECHARGEABLE LITHIUM-ION CELL

[75] Inventors: Dieter Bechtold, Bad Vilbel; Dietrich Bartke, Kelkheim; Peter Krämer, Königstein; Reiner Kretzschmar, Kelkheim; Jürgen Vollbert, Hattersheim, all of Germany

[73] Assignee: Varta Batterie Aktiengesellschaft, Hannover, Germany

[21] Appl. No.: 09/048,607

[22] Filed: Mar. 26, 1998

[30] Foreign Application Priority Data

Apr. 10, 1997 [DE] Germany .......................... 197 14 846

[51] Int. Cl.⁶ ..................................................... H01M 4/64
[52] U.S. Cl. .............................. 429/211; 429/53; 429/240
[58] Field of Search .............................. 429/53, 178, 181, 429/159, 163, 167, 240, 243, 211, 231.95, 168, 175, 177, 153, 154, 82

[56] References Cited

U.S. PATENT DOCUMENTS 5,766,798   6/1998   Bechtold et al. ........................ 429/211

*Primary Examiner*—Maria Nuzzolillo
*Assistant Examiner*—Monique M. Wills
*Attorney, Agent, or Firm*—Weiser & Associates, P.C.

[57] ABSTRACT

The invention relates to a rechargeable lithium-ion cell, a method for its manufacture, and its application. The cell is distinguished by the fact that it has a metallic housing (21) which is electrically insulated internally by two half shells (15), which cover electrode plates (8) and main output tabs (7) and are composed of a non-conductive material, where the metallic housing is electrically insulated externally by means of an insulation coating. The cell also has a bursting membrane (4) which, in its normal position, is located above the electrolyte level of the cell (1). In addition, the cell has a twisting protection (6) which extends over the entire surface of the cover (2) and provides centering and assembly functions for the electrode package, which comprises the electrode plates (8).

17 Claims, 4 Drawing Sheets

RECHARGEABLE LITHIUM-ION CELL

STATEMENT REGARDING FEDERALLY SPONSORED RESEARCH OR DEVELOPMENT

The Government of the United States of America has rights in this invention pursuant to Cooperative Agreement No. DE-FC02-91CE50336 awarded by the U.S. Department of Energy.

BACKGROUND OF THE INVENTION

1. Field of the Invention

The invention relates to a rechargeable lithium-ion cell.

2. Description of the Related Art

Rechargeable lithium-ion cells, in particular cells that can store amounts of energy from 20 to 100 Ah, require safety devices and a design shape of the cell to prevent the cells from being damaged by electrolyte loss, ingress of water, and/or problems with the electrical insulation. Heating of the cells, because of a high internal resistance when they are loaded with high currents, is also problematic. Different rechargeable lithium-ion cells are already known, which are intended to alleviate one or another of the problems during operation of the cells. In particular, however, when high-capacity cells are used for constructing battery modules for the operation of electrical road vehicles, the safety and reliability requirements for the lithium-ion cells that are used are particularly stringent.

SUMMARY OF THE INVENTION

An object of the invention is to specify rechargeable lithium-ion cells that are suitable for the particular requirements for battery modules in electrical road vehicles. This is achieved according to certain embodiments of the invention in such a manner that:

(a) the lithium-ion cell has a metallic housing, the inside surface of which is electrically insulated by two half shells, which are composed of a non-conductive material and cover the electrode plates and the main output tabs, where the outside surface of the metallic housing is electrically insulated by an insulation coating, (b) the lithium-ion cell has a bursting membrane which, in its normal position, is located above the electrolyte level of the cell, (c) the lithium-ion cell has a twisting protection that extends over the entire surface of the cover, and (d) the lithium-ion cell has centering and assembly functions for the electrode package, which includes the electrode plates.

The totality of the design features of the lithium-ion cell according to these embodiments of the invention takes into account the particular requirements relating to safety and the mechanical stresses on cells during operation in electrical road vehicles. For example, a cell housing made of stainless steel is preferred, because of the pressure robustness and protection against mechanical destruction of the cells. Since the metallic cell housings are conductive, the cell housing is highly suitable for use as an electrode pole. However, this also increases the risk of a short circuit, since a minor contact between the opposing electrode and the cell wall is sufficient to form a short circuit.

According to certain embodiments of the invention, good short-circuit immunity is produced by the internal and external insulation of the cell housing. The electrodes are electrically insulated with respect to the housing walls by means of the two half shells, which are interleaved in one another, resistant to electrolyte, and made of a non-conductive material, such as polyvinylidene difluoride (PVDF). In addition, external insulation of the cell according to preferred embodiments of the invention is provided by (1) a protective varnish coating or an insulating film of shrink sleeving, which extends up to about 10 mm below the upper edge of the cell container, and (2) a covering cap which is placed over the top of the cell and is made of an insulation material, such as polyethyleneterephthalate (PET).

According to certain embodiments of the invention, the positive electrode pole is manufactured from titanium or from aluminum-coated copper, and the negative electrode pole is manufactured from copper. This, on the one hand, ensures that the lithium-ion cell has very good electrochemical resistance, and, on the other hand, keeps the electrical resistance low. The heating of the cell, and thus the irreversible energy loss, when subjected to heavy current loads are advantageously reduced in this way.

In the case of cells in which a plurality of electrode plates are connected to the electrode pole, the positive main outputs are connected, according to certain embodiments of the invention, to an aluminum rivet by ultrasound welding, and this rivet is in turn connected by riveting, in particular wobble riveting, to the positive electrode pole. The copper output tabs of the negative electrode plates are welded to a copper rivet which is riveted to the negative electrode pole. Such connections between the electrode plates and the electrode poles result in the removal of the oxide layers, which would otherwise increase resistance, without damaging the surface of the electrode poles. These connections provide a cell that can be loaded with currents from 10 to 300 amperes and is mechanically robust, that is to say robust with regard to the vibration that occurs during vehicle operation.

Rechargeable lithium-ion cells according to certain embodiments of the invention are furthermore characterized by the fact that they have a bursting membrane which, in their normal position, is above the electrolyte level of the cells. In the event of damage to the bursting membrane, no electrolyte emerges just because of the force of gravity.

The electrode poles are advantageously designed as ceramic metal bushings. Prefabricated bushing elements are welded, by their welding flange made of a VA material (i.e., corrosion-resistant stainless steel), to the collar which is pulled into the cell cover and is composed of the same material. The electrode plates are placed within the insulating half shells and then pushed into the cell housing. The cells may be sealed, for example, by laser welding of the cover and cell container. This results in a hermetically sealed cell that avoids the ingress of water, which reduces cell life. Furthermore, the proposed cell and the method for its manufacture allow (1) assembly to be simplified, (2) cost-effective production by reducing the number of components required, and (3) greater safety of the cells as well as of their production.

BRIEF DESCRIPTION OF THE DRAWINGS

The invention is presented in more detail in the following text, with reference to FIGS. 1–9, in which.

DETAILED DESCRIPTION

Figure 2:
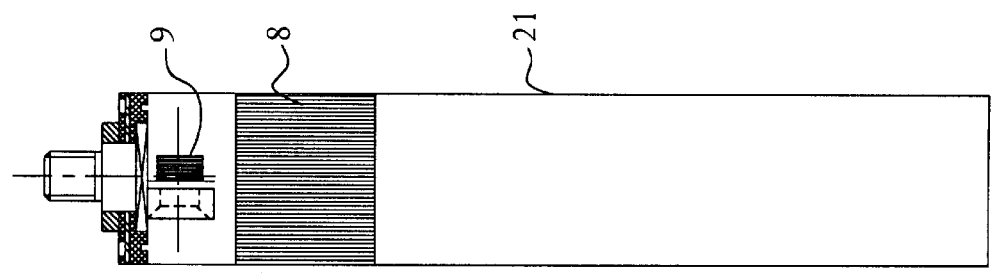
FIG. 2 shows a partial cross-section, side view of the cell of FIG. 1.
Figure 1:
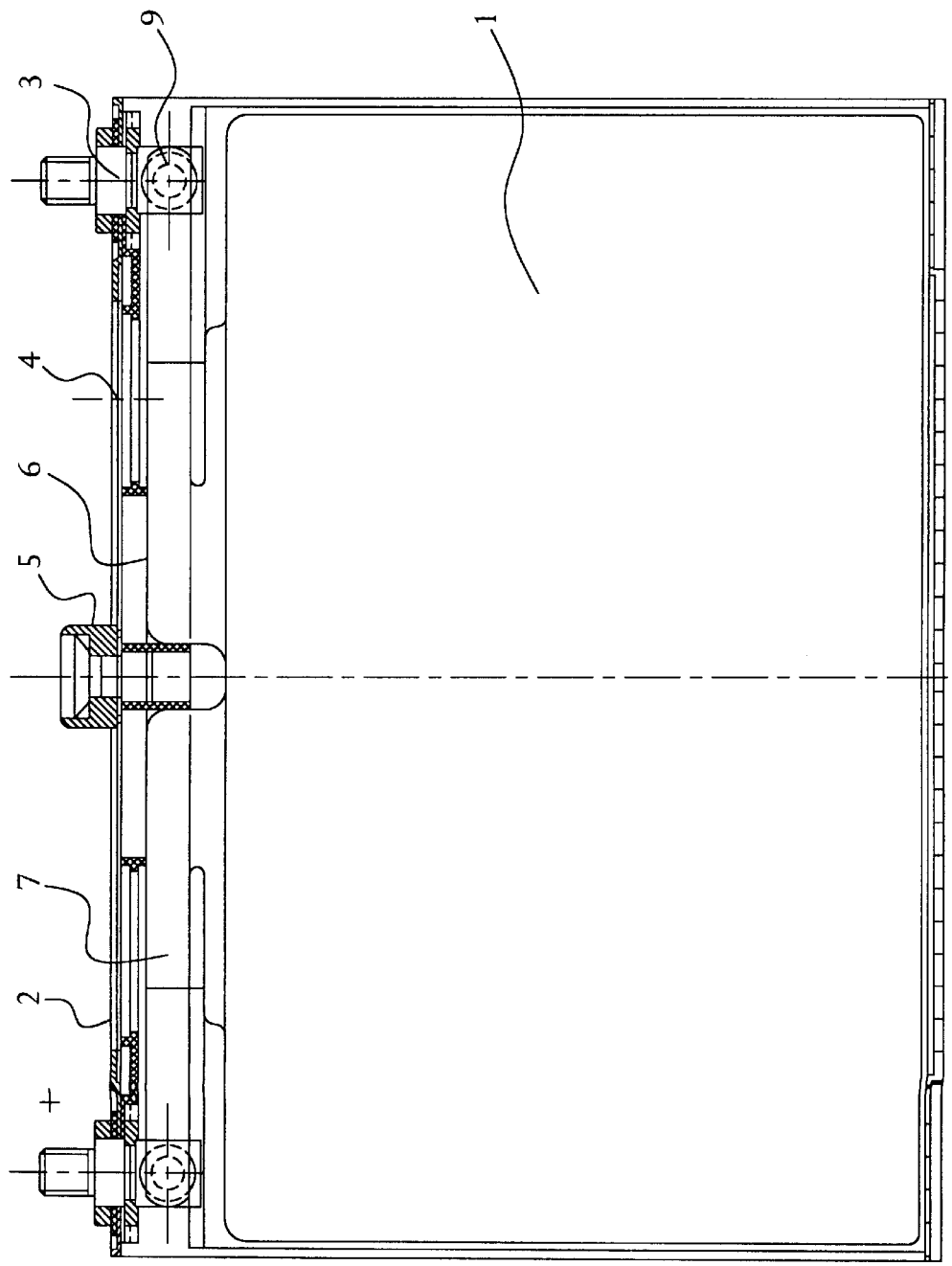
FIG. 1 shows a cross-section view of a cell, according to one embodiment of the invention.

FIGS. 1 and 2 show cross-section views of cell 1, according to one embodiment of the invention. In this case, electrode pole 3, bursting membrane 4, and filling dome 5 are integrated in cover 2. Twisting protection 6 extends over the inside of cover 2. Main output tabs 7 of electrode plates 8 are attached to electrode poles 3 by rivets 9, rivets 9 being connected to main output tabs 7 by ultrasound welding. The main output tabs of the positive electrode plates are preferably made of aluminum, welded to an aluminum rivet, and attached by wobble riveting to the positive electrode pole, which is coated with about 50 μm of pure aluminum. Wobble riveting, also known as swash riveting, is a special riveting method in which a galvanized surface is not destroyed during the riveting process. The main output tabs of the negative electrode plates are preferably made of copper, welded to a copper rivet, and riveted to the negative electrode pole.

Bursting membrane 4 is a cell compartment securing device that prevents the explosion of the cell by bursting at a defined interior cell pressure. Twisting protection 6 is a securing device that prevents the twisting of the terminal pole and, in this way, prevents the rupture of the welded current leads from the terminal.

Figure 3:
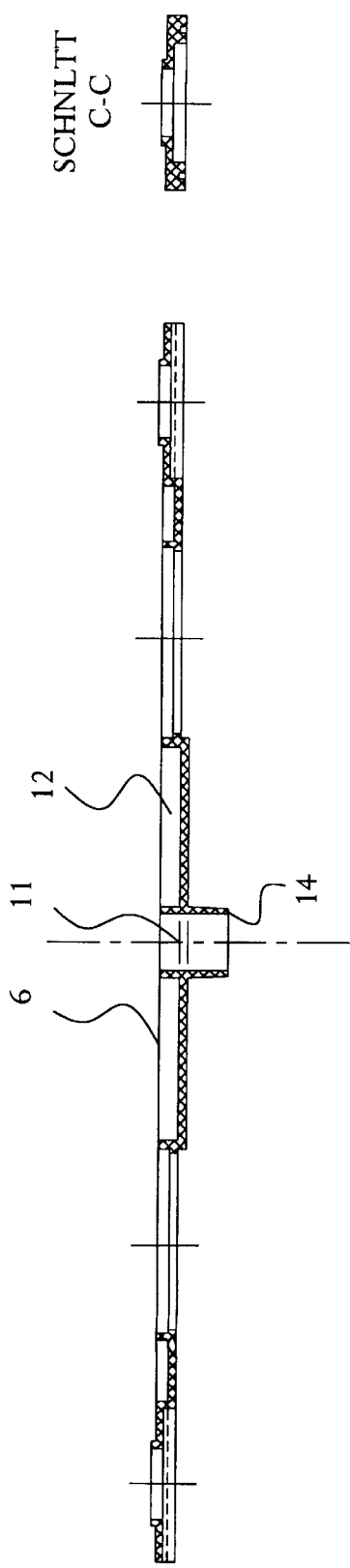
FIG. 3 shows a cross-section view of the twisting protection of the cell of FIG. 1.
Figure 4:
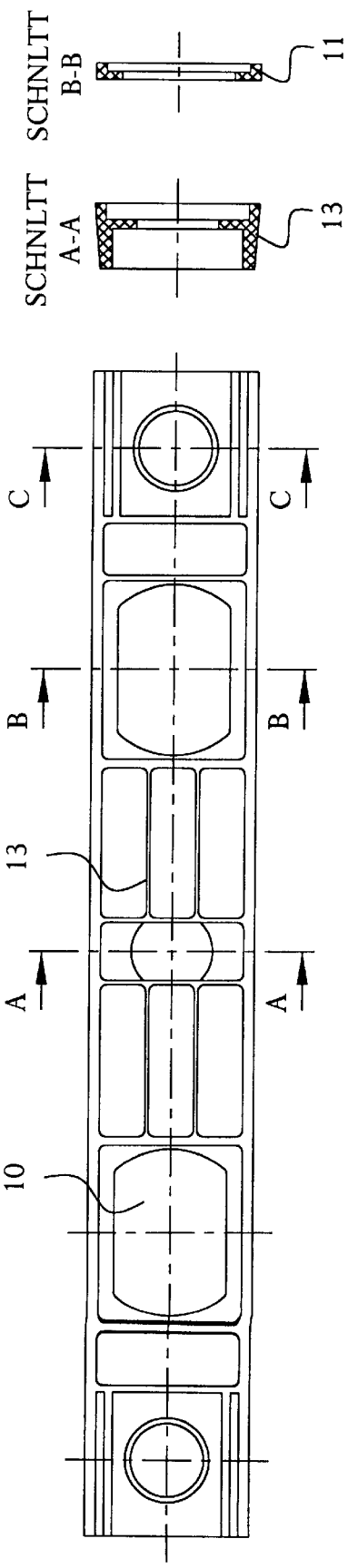
FIG. 4 shows a plan view of the twisting protection of FIG. 3.

FIGS. 3 and 4 show a cross-section view and a plan view, respectively, of twisting protection 6 of FIGS. 1 and 2. Twisting protection 6 has two passages 10 and one passage 11 to bursting membrane 4 and to filling dome 5, respectively. The two passages 10 to bursting membrane 4 are arranged symmetrically with respect to the section axis A—A. This simplifies assembly with regard to position orientation with respect to bursting membrane 4.

In the case of narrow cells 1, that is to say in the case of cells 1 whose electrode poles 3 are relatively close to one another, passages 10 are dispensed with and bursting membrane 4 is welded in filling dome 5. In this case, bursting membrane 4 is not introduced into bursting membrane dome 5 until after cell 1 has been filled with electrolyte and after the subsequent cycles for bringing it into use. A laser is advantageously used for this purpose, keeping the mechanical stress on bursting membrane 4 low and resulting in only a small amount of heat being introduced into cell 1. As result of the introduction of bursting membrane 4 being carried out as the last step in production, the chances of damaging bursting membrane 4 during production are reduced. Furthermore, consumption of this high-cost component is limited to the number of functional cells 1, since defective cells 1 can be sorted out before bursting membrane 4 is introduced.

Twisting protection 6 also has reinforced region 12 which extends, above the connecting region of main output tabs 7, to electrode plates 8. Region 12 is reinforced with ribs 13 and is recessed towards main output tabs 7. This mechanically assists the process of pushing in the electrode package, which is attached to cover 2 and includes the individual electrode plates 8. Twisting protection 6 also has section 14 which extends between main output tabs 7 of the different polarities, centers the position of electrode plates 8 with respect to one another, allows filling with electrolyte, and reduces the risk of short circuits in the region of main output tabs 7. Sections A—A, B—B, and C—C show the respective shapes of the twisting protection cross section.

Figure 6:
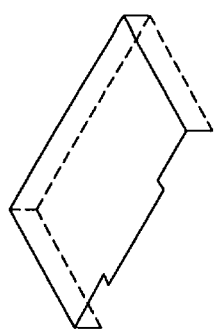
FIG. 6 shows a perspective view of the insulating half shell of FIG. 5.
Figure 5:
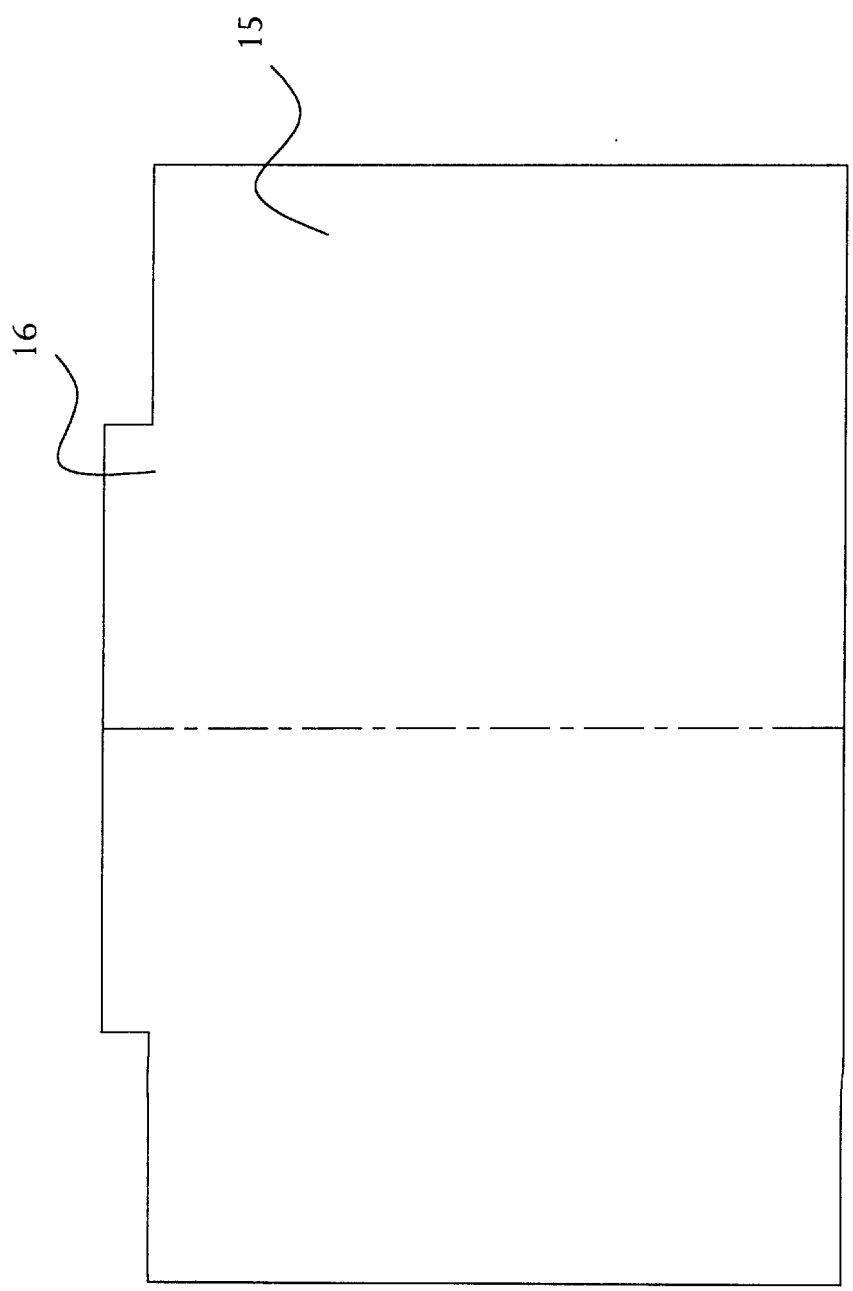
FIG. 5 shows a side view of an insulating half shell of the cell of FIG. 1.

FIGS. 5 and 6 show half shells 15, which are manufactured from a material that is resistant to electrolyte and is electrically non-conductive. Half shells 15 are preferably manufactured from polyvinylidene difluoride or a copolymer with hexafluoropropylene. Half shells 15 are interleaved with one another such that they enclose the electrode package. Lug 16 protects the region of the connection of main output tabs 7 to electrode plates 8 against contact with cell housing 21 of FIG. 2. Even if the separator is chafed through, half shells 15 protect electrode plates 8 against contact with cell housing 21.

Figure 7:
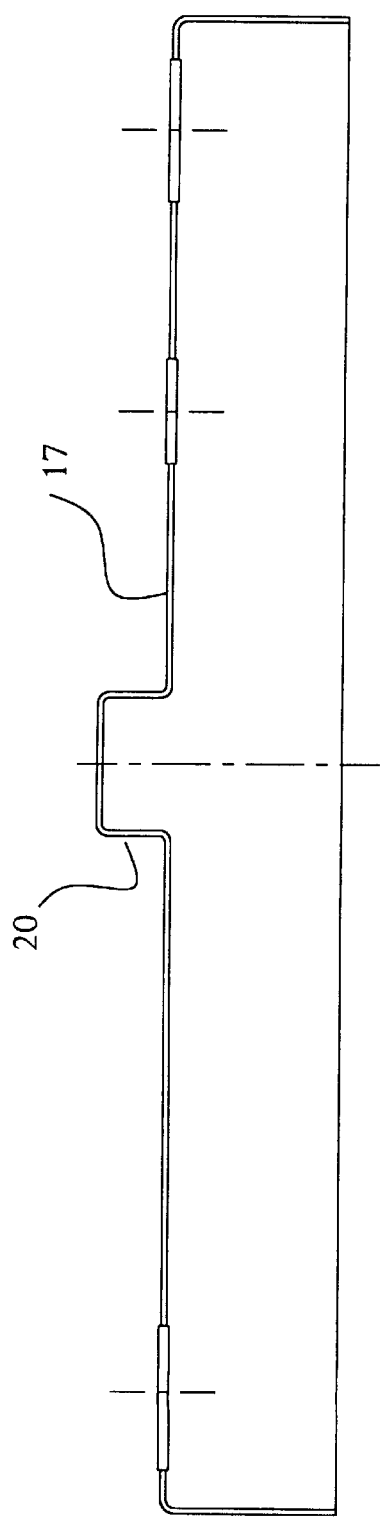
FIG. 7 shows a cross-section view of the covering cap of the cell of FIG. 1.
Figure 8:
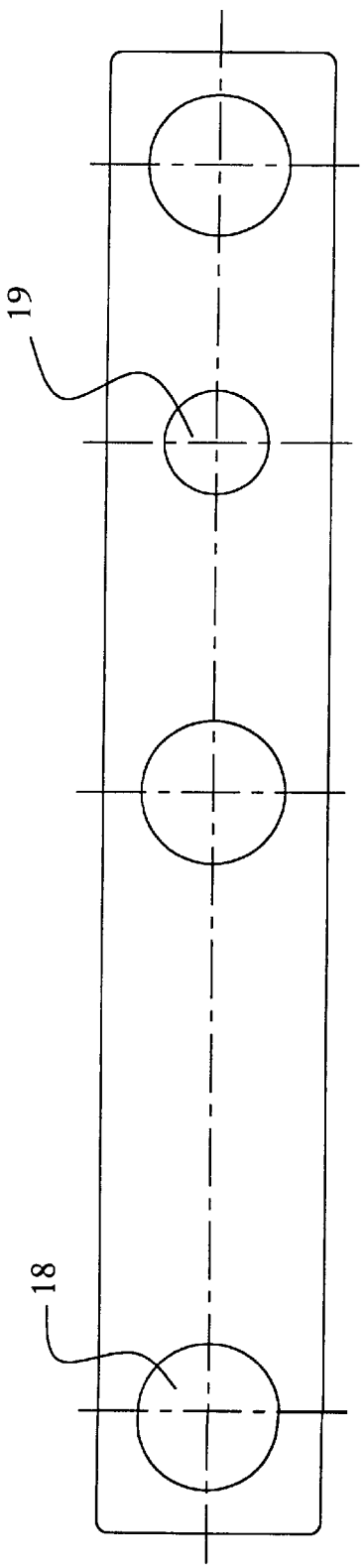
FIG. 8 shows a plan view of the covering cap of FIG. 7.

In addition to the protection which is formed from twisting protection 6 and half shells 15 in the interior of cell 1, an external electrical insulation of cell housing 21 is used for the electrical insulation of cell 1. For this purpose, cell housing 21 is insulated with a protective varnish coating for up to about 10 mm below the upper edge of cell container 21. Covering cap 17, which is illustrated in FIGS. 7 and 8, is placed over cover 2 of cell 1. Covering cap 17 has two openings 18 and one opening 19 for electrode poles 3 and to bursting membrane 4, respectively. Filling dome 5 is covered by dome 20 of covering cap 17. In the case of the narrow cells which have already been mentioned and in which bursting membrane 4 is integrated in filling dome 5, opening 19 is provided in a corresponding manner in dome 20 of covering cap 17.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A rechargeable lithium-ion cell, comprising:
   (a) a plurality of electrode plates having main output tabs;
   (b) two non-conducting half shells covering the electrode plates;
   (c) a metallic housing receiving the half shells and the electrode plates, wherein an outside surface of the metallic housing has an insulation coating;
   (d) a bursting membrane which, in its normal position, is located above an electrolyte level of the cell; and
   (e) a twisting protection, extending over the half shells and the electrode plates and providing centering and assembly functions for the electrode plates.

2. The cell of claim 1, wherein:
   the two half shells are interleaved in one another;
   the twisting protection has passages for the bursting membrane and for a filling dome of the cell; and
   the metallic housing has a protective varnish coating and a covering cap.

3. The cell of claim 1, further comprising positive and negative electrode poles connected to the electrode plates, wherein the positive electrode pole is coated with aluminum in the interior of the cell.

4. The cell of claim 3, wherein the electrode poles are connected in an electrolyte-tight manner to the cell housing by ceramic metal bushings.

5. The cell of claim 1, wherein the bursting membrane is welded in a filling dome of the cell.

6. The cell of claim 1, wherein:

the two half shells are interleaved in one another;

the twisting protection has passages for the bursting membrane and for a filling dome of the cell;

the metallic housing has a protective varnish coating and a covering cap; and further comprising positive and negative electrode poles connected to the electrode plates, wherein:

the positive electrode pole is coated with aluminum in the interior of the cell; and the electrode poles are connected in an electrolyte-tight manner to the cell housing by ceramic metal bushings.

7. The cell of claim 6, wherein the bursting membrane is welded in a filling dome of the cell.

8. A method for manufacturing a rechargeable lithium-ion cell, comprising:

(a) a plurality of electrode plates having main output tabs;

(b) two non-conducting half shells covering the electrode plates;

(c) a metallic housing receiving the half shells and the electrode plates, wherein an outside surface of the metallic housing has an insulation coating;

(d) a bursting membrane which, in its normal position, is located above an electrolyte level of the cell; and (e) a twisting protection, extending over the half shells and the electrode plates and providing centering and assembly functions for the electrode plates, which method comprises the steps of:

(1) welding the main output tabs of positive electrode plates to an aluminum rivet;

(2) riveting the aluminum rivet to a positive electrode pole;

(3) welding the main output tabs of negative electrode plates to a copper rivet;

(4) riveting the copper rivet to a negative electrode pole;

(5) sheathing the electrode plates within the two half shells and pushing the half shells and the electrode plates into the metallic housing;

(6) welding a cap over the metallic housing;

(7) filling the cell with electrolyte via a filling dome in the cell;

(8) cycling the cell; and (9) sealing the filling dome in an electrolyte-tight manner after the cell has been brought into use.

9. The method of claim 8, wherein step (9) is carried out by laser welding.

10. A power supply battery for motor vehicles comprising at least one rechargeable lithium-ion cell, wherein the rechargeable lithium-ion cell comprises:

(a) a plurality of electrode plates having main output tabs;

(b) two non-conducting half shells covering the electrode plates;

(c) a metallic housing receiving the half shells and the electrode plates, wherein an outside surface of the metallic housing has an insulation coating;

(d) a bursting membrane which, in its normal position, is located above an electrolyte level of the cell; and (e) a twisting protection, extending over the half shells and the electrode plates and providing centering and assembly functions for the electrode plates.

11. The power supply battery of claim 10, wherein:

the two half shells are interleaved in one another;

the twisting protection has passages for the bursting membrane and for a filling dome of the cell; and the metallic housing has a protective varnish coating and a covering cap.

12. The power supply battery of claim 10, further comprising positive and negative electrode poles connected to the electrode plates, wherein the positive electrode pole is coated with aluminum in the interior of the cell.

13. The power supply battery of claim 12, wherein the electrode poles are connected in an electrolyte-tight manner to the cell housing by ceramic metal bushings.

14. The power supply battery of claim 10, wherein the bursting membrane is welded in a filling dome of the cell.

15. The power supply battery of claim 10, wherein:

the two half shells are interleaved in one another;

the twisting protection has passages for the bursting membrane and for a filling dome of the cell;

the metallic housing has a protective varnish coating and a covering cap; and further comprising positive and negative electrode poles connected to the electrode plates, wherein:

the positive electrode pole is coated with aluminum in the interior of the cell; and the electrode poles are connected in an electrolyte-tight manner to the cell housing by ceramic metal bushings.

16. The power supply battery of claim 15, wherein the bursting membrane is welded in a filling dome of the cell.

17. The power supply battery of claim 10, comprising two or more of the rechargeable lithium-ion cells.

\* \* \* \* \*